Patented Mar. 23, 1937

2,074,876

UNITED STATES PATENT OFFICE 2,074,876

METHOD AND COMPOSITION FOR PREVENTING FLAT TIRES

Hans Paul Wagner, Brooklyn, N. Y., assignor to The Autosan Corporation of America, New York, N. Y., a corporation of New York No Drawing. Application March 2, 1935, Serial No. 9,017

2 Claims. (Cl. 134—17.5)

This invention relates to a method and composition for preventing flat tires, and has for one of its objects the provision of a mixture or compound that will by adhesion and mechanical action effectively seal inner tire-tube punctures, thus preventing flat tires.

Another object of the invention is to provide such a mixture within the inner tire-tube that, due to the rotation of the said tube and the air pressure therein, will effectively and efficiently seal any punctures therein.

A further object of the invention is the provision of a puncture sealing mixture comprising powdered mica and granulated mica of larger diameter, cellulose-ester, and granulated soft cork in a quantity of water and glycerine, the larger particles of mica acting as a closure for tire-tube punctures, and the smaller particles of mica acting as a filler between the larger particles and the inner tube surface.

Other objects and advantages will appear as the nature of the improvement is better understood, the invention consisting substantially in the novel ingredients and proportions used, as well as the manner of application thereof.

I am aware that there are other puncture-proofing mixtures now in use; the said mixtures, however, are of a chemical nature and have a harmful effect upon the rubber tube.

My improved composition for preventing flat tires in ordinary cars comprises:

1. 36% clean white mica free from iron, the size of this mica ranging from powder to about $\frac{1}{16}$ of an inch in diameter.
2. 18% of the same quality of mica, granules or flakes, but ranging in size from $\frac{1}{8}$ to $\frac{1}{4}$ of an inch in diameter.
3. 32½% cellulose-ester.
4. 13½% granulated soft cork.

The above ingredients are put into the inner tube through a funnel, and then a mixture of water and glycerine about 2.4 as great by weight is added, the proportions of glycerine and water is about ⅔ water and ⅓ glycerine. The object of the glycerine is to prevent freezing in winter, and the water serves to keep the mixture moist or damp. The glycerine used is preferably chemically pure.

The cellulose-ester forms an adhesive coating about the mica particles and prevents them from breaking up or pulverizing, and the cork acts as a carrier for the mica and to keep same in motion.

The action in case of a puncture is as follows:

Due to the rotation of the inner tube when the car is moving, the centrifugal force will throw the compound against the inner surface of the tube and the force or pressure of the air will force the larger mica particles against the puncture. The said mica particles being coated with the cellulose-ester will adhere to the tube surface and the smaller or powdered mica particles will act as a filler between the larger mica particles and tube surface, thus providing a highly efficient and flexible sealing patch at the puncture, and preventing the further escape of air from the tube. Inasmuch as the rotation of the automobile wheels is comparatively rapid, the puncture will be almost instantaneously sealed.

When the air of the tube is exhausted through the tube-valve, the sealing patch formed about the puncture may become unseated, but when air is again pumped in, the patch will again be forced against the puncture as any escaping air will draw the patch back into place.

For trucks or large cars, the proportions of ingredients used are as follows:

| | Per cent |
|---|---|
| 1. Powdered or small granuled mica | 27 |
| 2. Larger mica particles | 27 |
| 3. Cellulose-ester | 32½ |
| 4. Granulated soft cork | 13½ |

Water and glycerine in the same proportion as in the case of the ordinary car.

The amount of the mixture used depends upon the size of car and tube used. For an ordinary sized pleasure car, about ten ounces mica, cellulose-ester and cork mixture is used with about 24 ounces of glycerine and water. For larger cars, the amount may be proportionately increased.

With the use of my improved compound, holes up to about ¾ of an inch in diameter can be closed.

It will be understood that due to the rotation of the inner tubes with the automobile wheels, the resulting centrifugal force will deposit the puncture-proofing compound in even layers against the punctured surface of the tube. The greater the air pressure within the tire tube, the firmer will the patches adhere to the walls of the tube.

While I have named specific proportions of ingredients to be used for producing my improved puncture-proofing or sealing compound, I do not limit myself to the exact proportions named, as the said proportions may be varied without departing from the scope of my invention.

From the foregoing, it will be seen that I have provided a highly efficient method and composition for preventing flat tires and one that will not freeze in cold weather or break up on account of rotation and pressure or for any other reason.

Having described my invention, what I claim as new and desire to secure by Letters Patent is:

1. A puncture sealing compound for use in pneumatic tires formed by mixing solid ingredients consisting of more than one-half by weight of mica, at least one-third of the mica being in the form of flakes, at least one-eighth inch in diameter, granulated soft cork and nearly one-third by weight of a cellulose ester with a liquid consisting of water containing sufficient glycerin to prevent freezing in winter, the liquid and cellulose ester forming a viscous coating for the mica flakes.

2. A puncture sealing compound for use in pneumatic tires formed by mixing one part by weight of a mixture consisting of the following ingredients in approximately the proportions stated: Comparatively large mica flakes 18%, more finely divided mica 36%, granulated soft cork 13½%, cellulose ester 32½% with 2.4 parts by weight of a liquid consisting of water containing sufficient glycerin to prevent freezing in winter, the liquid and cellulose ester forming a viscous coating for the mica flakes.

HANS PAUL WAGNER.